United States Patent Office 2,947,747
Patented Aug. 2, 1960

2,947,747

TRIFLUOROMETHYL SUBSTITUTED PHENOXAZINES

Paul N. Craig, Roslyn, Pa., assignor to Smith Kline & French Laboratories, Philadelphia, Pa., a corporation of Pennsylvania No Drawing. Filed June 8, 1959, Ser. No. 818,509

13 Claims. (Cl. 260—244)

This invention relates to novel 10-(aminoalkyl)-2-trifluoromethylphenoxazines having utility as pharmacodynamic agents. This invention also relates to the novel 2-trifluoromethylphenoxazine of use as an intermediate in the preparation of the 10-(aminoalkyl)-phenoxazine derivatives.

The novel 10-(aminoalkyl)-2-trifluoromethylphenoxazine compounds of this invention have particular utility as sedatives, tranquilizers and antiemetics, and have a minimum of side effects.

More specifically, the novel 10-(aminoalkyl)-2-trifluoromethylphenoxazine compounds of this invention are represented by the following structure:

FORMULA I

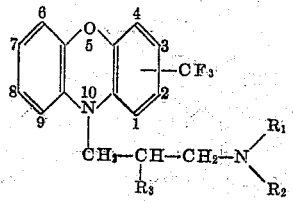

when $R_1$ and $R_2$ represent methyl, ethyl or divalent groups which, together with the nitrogen to which they are attached, form a six-membered heterocyclic ring, such as piperazinyl or substituted piperazinyl; and $R_3$ represents hydrogen or methyl.

Advantageous compounds of this invention are represented by the following structural formula:

FORMULA II

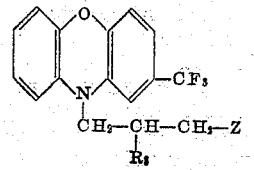

when Z represents dimethylamino, diethylamino, N-hydrogen piperazinyl, N-alkylpiperazinyl, N-(ω-hydroxyalkylene)-piperazinyl, N-(ω-acyloxyalkylene)-piperazinyl, N-(ω-hydroxyalkyleneoxyalkylene)-piperazinyl, N-(ω-hydroxyethoxyethoxyethyl)-piperazinyl, N-(ω-carbamyloxyalkylene)-piperazinyl or N-(ω-dialkylcarbamyloxyalkylene)-piperazinyl such as dimethyl- or diethylcarbamyl; and $R_3$ represents hydrogen or methyl.

Preferred compounds of this invention are represented by Formula II above when Z represents N-methylpiperazinyl, N-(ω-hydroxyethyl)-piperazinyl, N-(ω-acetoxyethyl)-piperazinyl, N-(ω-hydroxyethoxyethyl)-piperazinyl, N-(ω-hydroxyethoxyethoxyethyl)-piperazinyl, N-(ω-carbamyloxyethyl)-piperazinyl or N-(ω-dimethylcarbamyloxyethyl)-piperazinyl; and $R_3$ represents hydrogen or methyl, preferably hydrogen; in particular 10-[3'-(N-hydroxyethylpiperazinyl) - propyl] - 2 - trifluoromethylphenoxazine.

By the term aminoalkyl where used herein alone or in combination with other terms, moieties such as dialkylaminoalkyl and piperazinyl- or substituted piperazinylalkyl are indicated. The term N-alkylpiperazinyl represents a piperazinyl ring substituted on the free nitrogen with an aliphatic group having not more than 4 carbon atoms. The term alkylene represents aliphatic groups of from 2 to 4 carbon atoms. The term acyl represents groups derived from organic hydrocarbon carboxylic acids such as alkanoyl having from 2 to 4 carbon atoms or benzoyl.

This invention also includes salts of the above defined bases formed with pharmaceutically acceptable nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well known to the art.

The novel 2-trifluoromethylphenoxazine, used as an intermediate to prepare the 10-(aminoalkyl)-phenoxazines described in Formula I as is disclosed hereinafter, is prepared by the following synthetic route:

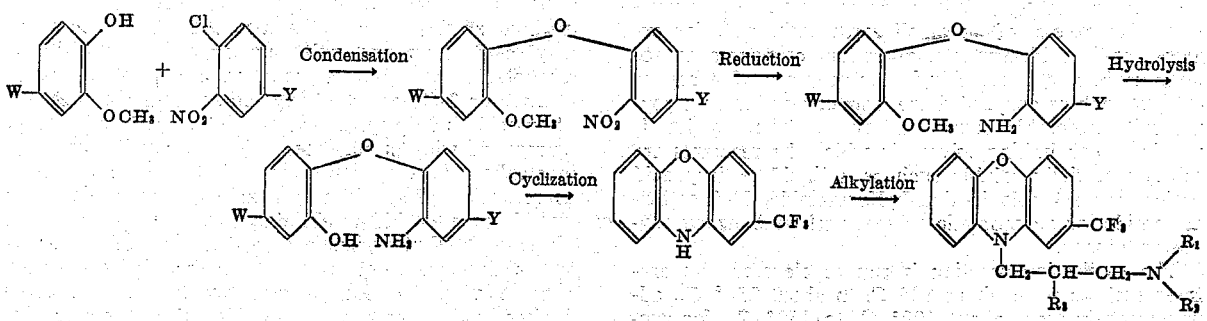

when one of W or Y is trifluoromethyl, and the other is hydrogen.

The compounds of this invention are prepared by condensing 2-nitrochlorobenzene and guaiacol(1-hydroxy-2-methoxybenzene) with the desired trifluoromethyl substituent in the 2 position in the end products being present either in the 4 position of the nitrohalobenzene or in the 4 position of the guaiacol to form the correspondingly trifluoromethyl substituted 2'-methoxy-2-nitrodiphenyl ether. The reactants are heated, preferably at reflux, in the presence of water and a condensing agent, for example, an alkali metal hydroxide such as sodium hydroxide or potassium hydroxide. The thus formed trifluoromethyl substituted-2'-methoxy-2-nitrodiphenyl ether is reduced preferably employing Raney nickel-hydrazine hydrate in ethanol or by catalytic hydrogenation, for instance with platinum oxide catalyst.

The resulting corresponding trifluoromethyl substituted-2'-methoxy-2-amidodiphenyl ether is then hydrolyzed to the 2-amino-2'-hydroxydiphenyl ether preferably by heating in the presence of 48% hydrobromic acid or by heating with hydrochloric acid in a closed system such as a sealed tube, the temperature of the reaction in both cases being maintained in the range of from about 120° C. to about 140° C. The substituted 2-amino-2'-hydroxydiphenyl ether is then cyclized to the desired 2-trifluoromethylphenoxazine by heating the amino compound with a mineral acid, for example, sulfuric, or a hydrohalic acid such as hydrobromic or hydrochloric acid, preferably in a closed system such as in a Carius tube, at from about 180° C. to 220° C. until the cyclization is complete, normally from 4 to 72 hours.

Alternatively, the novel 2-trifluoromethylphenoxazine intermediate is prepared by the following synthetic route:

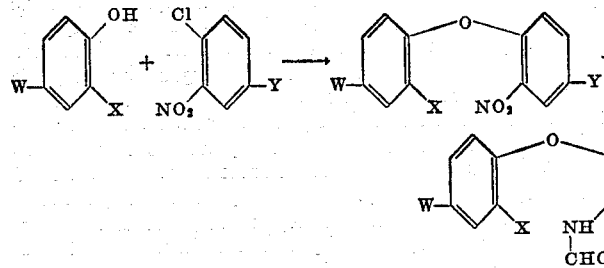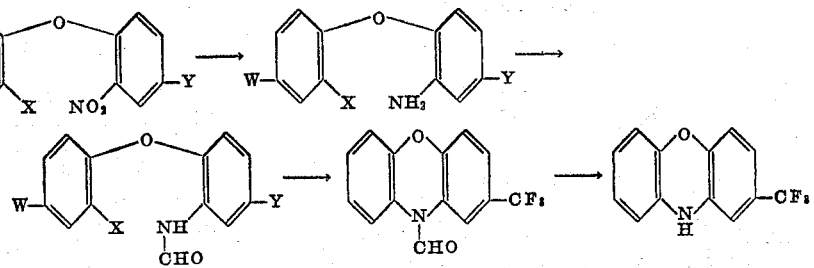

when X is a reactive halogen of atomic weight greater than 36, preferably bromine; and one of W or Y is trifluoromethyl, and the other is hydrogen. In carrying out this process, a 2-halophenol is condensed with a 2-chloronitrobenzene and the resulting 2'-halo-2-nitrodiphenyl ether is reduced chemically or catalytically to give the 2-amino-2'-halodiphenyl ether. The 2-amino diphenyl ether derivative is N-formylated, preferably as a melt, with a concentrated aqueous solution of formic acid such as from 50 to 98% formic acid. Advantageously commercial formic acid solution is used, about 85 to 95%. The formylation in aqueous solution is advantageously carried out at temperatures of from about 140–180° C., preferably about 160° C.

The resulting 2-formamido-2'-halodiphenyl ether is cyclized by heating with one molar equivalent, or preferably an excess, of an alkali earth carbonate, for example sodium bicarbonate, potassium carbonate or sodium carbonate, preferably in the presence of a copper catalyst such as copper bronze, copper powder or a copper salt, preferably cupric carbonate. The reaction is run in a high boiling solvent in which the reactants are at least partially soluble such as a liquid tertiary acid amide, for example N-dimethylformamide, N-dimethylacetamide, or an aromatic solvent such as benzene, xylene or toluene.

The cyclization reaction is run at elevated temperatures such as from about 80° C. to about 250° C., advantageously from about 100° C. to 150° C., for prolonged periods such as from 10 to 48 hours. The reaction is usually run at the boiling point of the reaction mixture.

A particularly advantageous modification of this process is to employ a high boiling aromatic solvent such as benzene, toluene or xylene in the cyclization reaction which distills azeotropically with water. Removal of the water from the reaction mixture as it is formed enhances yields.

The N-formyl derivative which is formed by the cyclization reaction is hydrolyzed preferably with alkali such as with dilute sodium or potassium hydroxide solution to give the 2-trifluoromethylphenoxazine intermediate. In general, it is preferred to carry out the reaction without isolating the N-formyl derivative. The process outlined above is described more fully in a co-pending application, Serial No. 813,082, filed May 14, 1959.

To form the compounds of Formula I, 2-trifluoromethylphenoxazine prepared as described above is alkylated with a reactive aminoalkyl ester such as a halide, preferably chloride or bromide, or an arylsulfonate such as p-tosylate or phenylsulfonate in a suitable inert aromatic solvent such as benzene, xylene or toluene, in which at least one of the reactants must be soluble. A suitable acid-binding agent may be included such as an alkali metal amide, preferably sodium amide or potassium amide; an alkali metal hydride, for example, sodium or potassium hydride, and preferably sodium hydride; an alkali metal hydroxide, for example, sodium or potassium hydroxide and preferably potassium hydroxide or an alkali metal aryl or alkyl compound, preferably phenyl sodium or octyl sodium.

If an acid addition salt of the reactive aminoalkyl ester is used, a corresponding increase in the amount of acid-binding agent must also be used. The preferred method of alkylation, however, is to react the 2-trifluoromethylphenoxazine with an aminoalkyl chloride or bromide with a slight excess of sodium or potassium amide in refluxing benzene or toluene for from 30 minutes to 24 hours, preferably two to eight hours.

The 10-(ω-piperazinylalkyl)-2-trifluoromethylphenoxazines are prepared advantageously by alkylating 2-trifluoromethylphenoxazine with an ω-haloalkylpiperazine with the free N-hydrogen of the piperazinyl moiety protected by, for example, a benzyl, carbobenzoxy, carbethoxy or formyl group. The N-protective group is then removed, such as by mild hydrolysis. The resulting ω-piperazinylalkyl phenoxazine may be alkylated further to form various substituted piperazinyl derivatives of this invention as set forth specifically in Formula II. Such methods of alkylation are by a reactive ester such as an alkyl halide, an aryl sulfonate or a halo substituted alcohol, for example ethylene chlorohydrin, ω-bromobutanol or 2-(2'-bromoethoxy)-ethanol, in the presence of an acid-binding agent in inert solution such as benzene; by reaction with an alkylene oxide such as ethylene oxide in alcohol or by reduction of a N-acyl compound such as reduction of the N-acyl analogue with a bimetallic hydride such as lithium aluminum hydride. In addition, 10-(N'-alkyl-N-piperazinylalkyl)-2-trifluoromethylphenoxazines having a terminal group on the N'-alkyl moiety capable of undergoing reaction are optionally reacted further in the presence of an acid-binding agent to give the corresponding N'-substituted-alkyl derivatives. As examples of terminal groups on the N'-alkyl moiety which can be reacted further, an ω-hydroxyalkylene is reacted with an ester such as an acyl halide in the presence of an acid-binding agent to give an ω-acyloxyalkylene derivative; an ω-haloalkylene is reacted with a mono alkali metal glycolate such as mono sodium ethylene glycolate by refluxing in an inert solvent such as benzene or toluene to give an N'-hydroxyalkyleneoxyalkylene derivative; or an ω-haloalkylene such as ω-chloroethyl is reacted with an excess of β-hydroxyethyl ether in the presence of an acid-binding agent in an inert solvent such as benzene or toluene to give an N'-hydroxyethoxyethoxyethyl derivative.

The end products of this process may be combined with a pharmaceutical carrier for administration to humans in an amount to attain the desired pharmacodynamic effect. Such carriers are either solid or liquid. Exemplary of solid pharmaceutical carriers are lactose, cornstarch, mannitol, talc, etc. The compounds of this invention are mixed with the carrier and filled into hard gelatin capsules or tableted with suitable tableting aids such as magnesium stearate, starch, or other lubricants, disintegrants or coloring agents. If combination with a liquid carrier is desirable, a soft gelatin capsule is filled with a slurry of the novel compounds in soybean or peanut oil. Aqueous suspensions or solutions are prepared for alternate oral or parenteral administration.

The following examples are drawn to illustrate novel compounds of this invention and will serve to illustrate procedures for the preparation of the compounds as well as the utility of 2-trifluoromethylphenoxazine as an intermediate. It will be readily apparent to one skilled in the art that variations of these procedures are possible.

*Example 1*

A mixture of 100 g. of 4-chloro-3-nitrotrifluoromethylbenzene, 140 g. of guaiacol, 60 g. potassium hydroxide and 20 ml. of water is heated at reflux with stirring for three hours. After cooling, the reaction mixture is shaken with a mixture of benzene and dilute alkali solution and water. After evaporation of the solvent and distillation of the excess nitro compound, the crude 2'-methoxy-2-nitro-4-trifluoromethyldiphenyl ether is obtained.

A solution of 125 g. of the crude diphenyl ether in 700 ml. of ethanol is treated with 12 g. of Raney nickel and 95 ml. of hydrazine hydrate with stirring. The reaction mixture is heated on the steam bath for one hour, then filtered through a filter aid. The solvent is evaporated in vacuo and 500 ml. of 48% hydrobromic acid added. The acid mixture is then heated for two hours as the vapor temperature climbs to 120–125° C. The acid solution is diluted with water. The precipitate is dissolved in sodium hydroxide solution, washed with ether and recovered by acidification with acetic acid. After filtration, washing with water and drying, 2-amino-2'-hydroxy-4-trifluoromethyldiphenyl ether is obtained.

Sixty grams of this ether are heated with 8.0 ml. of concentrated hydrochloric acid in two Carius tubes at 200° C. for ten hours. The solid is dissolved in acetone, neutralized with sodium bicarbonate and evaporated in vacuo. The residue is then distilled by short passage distillation to give a solid distillate which is taken into benzene. Unchanged starting material is recovered by extracting the benzene solution with dilute sodium hydroxide solution. The benzene layer is dried, concentrated and diluted with hexane to give crystals of 2-trifluoromethylphenoxazine.

A suspension of 5.0 g. of 2-trifluoromethylphenoxazine, 3.0 g. of 3-chloro-1-dimethylaminopropane and 1.0 g. of sodium amide in 30 ml. of benzene is heated at reflux with stirring for eight hours. The cooled mixture is quenched with 20 ml. of water. The benzene layer is separated and extracted with hydrochloric acid. On addition of caustic to the aqueous layer, the base is recovered, and distilled with a microdistillation, short path apparatus to give 10-(3'-dimethylaminopropyl)-2-trifluoromethylphenoxazine.

*Example 2*

A mixture of 261 g. of 2-bromophenol, 340 g. of 3-nitro-4-chlorobenzotrifluoride and 20 ml. of water is stirred while 94 g. of potassium hydroxide is added slowly for 15 minutes. The mixture is heated at 110–115° C. for three hours. Water (200 ml.) is added. The organic layer is distilled to give 2-nitro-4-trifluoromethyl-2'-bromodiphenyl ether.

A mixture of 387 g. of the nitro compound and 475 g. of iron filings in 1750 ml. of water is stirred at reflux temperature for three hours while 1 l. of glacial acetic acid is gradually added. After refluxing for 3 hours, the mixture is cooled and thoroughly extracted with benzene. The residue from the extract is 2-amino-4-trifluoromethyl-2'-bromodiphenyl ether.

A mixture of 61 g. of the amine and 159 g. of 90% formic acid is heated to a liquid temperature of about 160° C. Water and excess formic acid are allowed to distill off. The remaining volatiles are taken off the crude 2-formamido-4-trifluoromethyl-2'-bromodiphenyl ether by applying a vacuum of 20–30 mm. The crude formyl derivative is mixed with 17 g. of potassium carbonate, 1 g. of cupric carbonate and 100 ml. of xylene. The mixture is heated at reflux over a water separator for 20 hours. A solution of 8 g. of sodium hydroxide in 50 ml. of water is added to the xylene solution of N-formyl-2-trifluoromethylphenoxazine and the mixture is heated at reflux for two hours. The mixture is diluted with water and benzene sufficiently to completely dissolve the solid. The benzene layer is removed and the residue vacuum distilled to give a 70% yield of 2-trifluoromethylphenoxazine.

*Example 3*

A suspension of 12.1 g. of 2-trifluoromethylphenoxazine and 8.0 g. of potassium amide in 150 ml. of toluene is heated at reflux with stirring briefly. After the addition of 15.0 g. of 3-bromo-1-diethylaminopropane hydrobromide, the reflux period is continued for six hours. The reaction mixture is cooled, diluted carefully with water and neutralized. The organic layers are extracted with dilute hydrochloric acid. The desired base, 10-(3'-diethylaminopropyl)-2-trifluoromethylphenoxazine, is then isolated by regenerating the base with sodium carbonate and molecularly distilling the base.

A solution of 3.4 g. of the base is dissolved in 50 ml. of ethyl acetate. A solution of 1.2 g. of maleic acid in 25 ml. of ethyl acetate is added. The filtered solution is evaporated to a low volume diluted somewhat with ether and cooled to separate 10-(3'-diethylaminopropyl)-2-trifluoromethylphenoxazine maleate.

*Example 4*

A suspension of 4.3 g. of the p-toluenesulphonic acid salt of 3-dimethylaminopropyl-1-p-toluenesulphonate, prepared by the reaction of p-toluenesulphonyl chloride with 1-dimethylamino-3-hydroxypropane in pyridine then forming the salt from the resulting free base, 2.3 g. of sodium amide and 5.0 g. of 2-trifluoromethylphenoxazine in 75 ml. of toluene is heated at reflux for three hours. The cooled reaction mixture is washed with water and extracted with several portions of dilute hydrochloric acid. The acid extracts are then worked up as before to yield the desired 10-(3'-dimethylaminopropyl)-2-trifluoromethylphenoxazine.

Part of this free base (750 mg.) is dissolved in ethanol. The solution is saturated with hydrogen chloride gas. Crystals of 10-(3'-dimethylaminopropyl)-2-trifluoromethylphenoxazine hydrochloride separate after gradual evaporation on the steam bath and trituration with ether.

*Example 5*

A suspension of 12.5 g. of 2-trifluoromethylphenoxazine, 7.4 g. of 3-chloro-2-methyl-1-dimethylaminopropane and 2.0 g. of sodium amide in 100 ml. of dry benzene is heated at reflux for eight hours. The reaction mixture is diluted with water, neutralized and the organic layers separated. Vacuum distillation yields 10-(2'-methyl-3'-dimethylaminopropyl) - 2 - trifluoromethylphenoxazine.

Example 6

A mixture of 2.5 g. of 2-trifluoromethylphenoxazine, 0.4 g. of sodium amide and 50 ml. of xylene is stirred and heated at reflux for 20 minutes. A solution of 1.9 g. of 1-(3'-chloropropyl)-4-methylpiperazine in 10 ml. of xylene is added and the mixture refluxed for several hours. The cooled reaction mixture is heated with water, extracted with dilute hydrochloric acid and the acid extracts neutralized with aqueous ammonia. Benzene extraction and subsequent removal of the dried solvent in vacuo yields 10-[3'-(4''-methyl-1''-piperazinyl)-propyl]-2-trifluoromethylphenoxazine.

An ethereal solution of the free base is treated with ethereal hydrogen chloride to give the dihydrochloride salt.

Example 7

A suspension of 5.0 g. of 2-trifluoromethylphenoxazine, 0.8 g. of sodium amide and 5.1 g. of N-carbethoxy-N'-(3-chloropropyl)-piperazine in 100 ml. of toluene is heated at reflux for four hours. Working up the reaction mixture as in Example 6 yields 10-[3'-(N-carbethoxypiperazinyl)-propyl]-2-trifluoromethylphenoxazine.

A solution of 2.5 g. of the free base in 25 ml. of aqueous ethanol and 1.5 ml. of 40% sodium hydroxide solution is heated at reflux for four hours. The solvent is removed in vacuo and the residue treated with benzene and water. The dried organic layer is evaporated to give the product, 10-(3'-piperazinylpropyl)-2-trifluoromethylphenoxazine.

Example 8

One equivalent of ethylene oxide is added to a solution of 10.0 g. of 10-(3'-piperazinylpropyl)-2-trifluoromethylphenoxazine (prepared as in Example 7) in 50 ml. of methanol and the mixture heated at reflux for one and one-half hours. The solvent is removed in vacuo and 4.0 g. of acetyl chloride in 20 ml. of benzene is added to a benzene solution of the residual hydroxyethyl compound. This mixture is refluxed for 20 minutes and solvents are removed in vacuo to give 10-[3'-(N-acetoxyethylpiperazinyl)-propyl] - 2 - trifluoromethylphenoxazine hydrochloride. Treating an alcoholic solution of the hydrochloride with isopropanolic hydrogen chloride yields the dihydrochloride salt.

Similarly, acylating the 10-[3'-(N-hydroxyethylpiperazinyl)-propyl]-2-trifluoromethylphenoxazine (prepared as described above) with benzoyl chloride furnishes the 10-[3'-(N-benzoyloxyethylpiperazinyl)-propyl] - 2 - trifluoromethylphenoxazine hydrochloride which may be converted to the dihydrochloride salt as above.

Example 9

A suspension of 3.8 g. of 10-(3'-piperazinylpropyl)-2-trifluoromethylphenoxazine, 1.9 g. of ω-bromobutanol and 2.1 g. of potassium carbonate in 100 ml. of xylene is stirred and heated at reflux for five hours. After the addition of water to the reaction mixture, the separated xylene layer is extracted with dilute hydrochloric acid. The acid extracts are neutralized and extracted with benzene. Removing the benzene by distillation in vacuo yields the product, 10-[3'-(N-ω-hydroxybutylpiperazinyl)-propyl]-2-trifluoromethylphenoxazine.

Example 10

A mixture of 5.0 g. of 2-trifluoromethylphenoxazine, 0.8 g. of sodium amide and 4.2 g. of 1-(3'-chloro-2'-methylpropyl)-4-methylpiperazine in 100 ml. of xylene is stirred and refluxed for four hours. Working up the cooled reaction mixture as described in Example 6 yields 10 - [3' - (4'' - methyl - 1'' - piperazinyl) - 2' - methylpropyl]-2-trifluoromethylphenoxazine.

Reaction of a saturated ethereal solution of tartaric acid with the free base yields the corresponding tartrate salt.

Example 11

A suspension of 15.0 g. of 10-(3'-piperazinylpropyl)-2-trifluoromethylphenoxazine, 8.4 g. of 2-bromo-2'-hydroxyethyl ether and 8.3 g. of potassium carbonate in 250 ml. of toluene is refluxed for six hours. The reaction mixture is treated with water, the organic layer treated with acid, made basic and re-extracted. Evaporation of the extracts yields 10-[3'-(N-hydroxyethoxyethylpiperazinyl) - propyl] - 2 - trifluoromethylphenoxazine.

Example 12

A suspension of 7.5 g. of 10-(3'-piperazinylpropyl)-2-trifluoromethylphenoxazine, 5.6 g. of 4-bromo-4'-hydroxybutyl ether (prepared by the careful treatment of 4,4'-dihydroxybutyl ether with one equivalent of hydrobromic acid) and 4.2 g. of potassium carbonate in 150 ml. of xylene is refluxed for 24 hours. Working up the reaction mixture as in Example 11, 10-[3'-(N-hydroxybutoxybutylpiperazinyl) - propyl] - 2 - trifluoromethylphenoxazine is obtained.

Example 13

A solution of 4.2 g. of 10-[3'-(N-hydroxyethylpiperazinyl)-propyl]-2-trifluoromethylphenoxazine (prepared as in Example 8) and 1.9 g. of propionyl chloride in 50 ml. of benzene is heated at reflux for one hour. The reaction mixture is cooled and the solvent removed in vacuo. The residue is dissolved in alcohol and treated with isopropanolic hydrogen chloride to give the product, 10 - [3' - (N - propionyloxyethylpiperazinyl) - propyl]-2-trifluoromethylphenoxazine dihydrochloride.

Example 14

A mixture of 7.6 g. of 10-(3'-piperazinylpropyl)-2-trifluoromethylphenoxazine, 0.8 g. of sodium amide and 1.8 g. of propyl chloride in 100 ml. of toluene is refluxed for six hours. The cooled reaction mixture is treated with water, extracted with dilute hydrochloric and further worked up as described in Example 6 to give 10-[3'-(4'' - propyl - 1'' - piperazinyl) - propyl] - 2 - trifluoromethylphenoxazine.

Treating the free base with anhydrous hydrogen bromide in an ether-alcoholic solution gives the corresponding dihydrobromide salt.

Example 15

A mixture of 24.6 g. of 10-[3'-(N-hydroxyethylpiperazinyl)-propyl]-2-trifluoromethylphenoxazine dihydrochloride (prepared by treating the N-hydroxyethyl free base prepared as in Example 8 with an excess of isopropanolic hydrogen chloride) and 9.0 g. of thionyl chloride in 200 ml. of chloroform is refluxed for five hours. The solvent is removed by evaporation to give a solid, 10-[3'-(N-β-chloroethylpiperazinyl)-propyl]-2-trifluoromethylphenoxazine dihydrochloride.

A mixture of 29.6 ml. of β-hydroxyethyl ether and 25 ml. of benzene is heated over an azeotropic trap until 10 ml. of benzene is collected. To the cooled residue 0.7 g. of sodium is added and refluxing continued until the sodium has disappeared. The dihydrochloride salt of the chloro intermediate prepared as above (5.1 g.) is added and the mixture is heated and stirred on the steam bath for three hours, allowing the benzene to evaporate. The residue is stirred at room temperature for 18 hours, then quenched with 100 ml. of water. The mixture is extracted with benzene. The extracts are taken through dilute hydrochloric acid and then neutralized to give an oil which is extracted into chloroform. The chloroform is removed and the residue dissolved in ethyl acetate is treated with an excess of maleic acid to give 10-[3'-(N - hydroxyethoxyethoxyethylpiperazinyl) - propyl] - 2-trifluoromethylphenoxazine dimaleate.

Example 16

Phenyl chlorocarbonate (1.9 g.) is added to a solution of 4.2 g. of 10-[3'-(N-hydroxyethylpiperazinyl)-propyl]-2-trifluoromethylphenoxazine (prepared as in Example 8) in 25 ml. of anhydrous pyridine with stirring and maintaining the temperature at 25–30° C. After 15 hours, 25 ml. of water is added and the mixture is extracted with chloroform. The washed extracts are dried and concentrated to a residue consisting of the phenylcarbonate of 10 - [3' - (N - hydroxyethylpiperazinyl)-propyl]-2-trifluoromethylphenoxazine.

A solution of the phenylcarbonate obtained as above in 50 ml. of anhydrous ether is added dropwise to 100 ml. of liquid ammonia with stirring. After 10 hours the reaction mixture is treated with water and extracted with ether. The ether extracts are washed with dilute sodium carbonate solution, dried and concentrated in vacuo to give the residual 10-[3'-(N-carbamyloxyethylpiperazinyl)-propyl]-2-trifluoromethylphenoxazine.

The free base is converted to the dihydrochloride salt by treatment with ethanolic hydrogen chloride.

Example 17

A mixture of 4.2 g. of 10-[3'-(N-hydroxyethylpiperazinyl)-propyl]-2-trifluoromethylphenoxazine and 0.3 g. of powdered sodium in 100 ml. of toluene is stirred and heated at reflux for three hours. To the cooled mixture is added 2.6 g. of dimethylcarbamyl chloride with stirring and refluxing is continued for three hours. The cooled reaction mixture is treated with water and the toluene layer is separated. Concentration of the dried toluene solution in vacuo yields 10-[3'-(N-dimethylcarbamyloxyethylpiperazinyl) - propyl] - 2 - trifluoromethylphenoxazine.

Treating a solution of the free base in ethyl acetate with excess maleic acid furnishes the dimaleate salt.

Similarly, by employing 3.2 g. of diethylcarbamyl chloride in the above procedure, 10-[3'-(N-diethylcarbamploxyethylpiperazinyl)-propyl] - 2 - trifluoromethylphenoxazine is obtained.

Example 18

To a solution of 18.9 g. of 10-(3'-piperazinylpropyl)-2-trifluoromethylphenoxazine (prepared as in Example 7) in 50 ml. of dimethylformamide is added a solution of 12.6 g. of p-nitrophenethyl bromide in 75 ml. of dimethylformamide. After stirring at 95–105° C. for six and one-half hours, the solution is cooled and poured into 1 l. of water. The mixture is made alkaline with 10% sodium hydroxide and is extracted with chloroform. The chloroform extracts are washed with water, dried and filtered. The solvent is removed from the filtrate to give 1-(p-nitrophenethyl)-4-[3-(2-trifluoromethyl-10-phenoxazinyl)-propyl]-piperazine.

A mixture of 5.3 g. of the nitro derivative prepared above dissolved in 100 ml. of warm ethanol and 0.3 g. of platinum oxide is shaken over 50 p.s.i. of hydrogen for one hour. The catalyst is filtered and washed with ethanol. The ethanol solutions are combined and concentrated in vacuo on the steam bath to give the residual 1 - (p - aminophenethyl) - 4 - [3 - (2 - trifluoromethyl-10-phenoxazinyl)-propyl]-piperazine which is converted to the trihydrochloride salt.

Example 19

A mixture of 19.9 g. of N-benzyl-o-aminophenol and 22.6 g. of 4-chloro-3-nitrobenzotrifluoride in 250 ml. ethanol and 100 ml. water is warmed for 15 minutes with 10 ml. of 40% sodium hydroxide. After cooling, the product 10-benzyl-3-trifluoromethylphenoxazine, is separated and subjected to a catalytic debenzylation at 200 p.s.i. of hydrogen and 100° C. in acetic acid, using palladium charcoal as a catalyst. The acetic acid solution is filtered and poured onto water, which precipitated the 3-trifluoromethylphenoxazine as glistening platelets, which are dried and used in the alkylation procedure without further purification.

Example 20

A suspension of 5.0 g. of 3-trifluoromethylphenoxazine, 0.8 g. of sodium amide and 5.1 g. of N-carbethoxy-N'-(3-chloropropyl)-piperazine in 100 ml. of xylene is stirred and heated at reflux for 18 hours. Working up the reaction mixture as in Example 6 yields 10-[3'-(N-carbethoxypiperazinyl) - propyl] - 3 - trifluoromethylphenoxazine as the free base.

A solution of 2.5 g. of the free base in 25 ml. of aqueous ethanol and 1.5 ml. of 40% sodium hydroxide solution is heated at reflux for four hours. The solvent is removed in vacuo and the residue is treated with benzene and water. The dried organic layer is evaporated to give the product, 10-(3'-piperazinylpropyl)-3-trifluoromethylphenoxazine.

The reaction of 10.0 g. of this product and one mole of ethylene oxide, carried out as in Example 8, gives the corresponding product, 10 - [3' - (N - hydroxyethylpiperazinyl) - propyl] - 3 - trifluoromethylphenoxazine.

This application is a continuation-in-part of pending application Serial No. 754,131, filed August 11, 1958, which is a continuation of application Serial No. 624,974, filed November 29, 1956, now abandoned.

What is claimed is:

1. Chemical compounds of the class consisting of a free base and its nontoxic organic and inorganic acid addition salts, the free base having the formula:

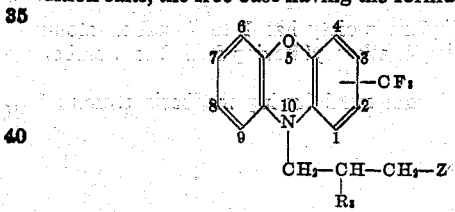

in which Z is a member selected from the group consisting of dimethylamino, diethylamino, N-hydrogen piperazinyl, N-alkylpiperazinyl, the alkyl moiety having from 1 to 4 carbon atoms, N-(ω-hydroxyalkylene)-piperazinyl, N - (ω - alkanoyloxyalkylene) - piperazinyl, the alkanoyl moiety having from 2 to 4 carbon atoms, N - (ω - benzoyloxyalkylene) - piperazinyl, N - (ω - hydroxyalkyleneoxyalkylene) - piperazinyl, N - (ω - hydroxyethoxyethoxyethyl) - piperazinyl, N - (ω - carbamyloxyalkylene) - piperazinyl, N - (ω - dimethylcarbamyloxyalkylene) - piperazinyl and N - (ω-diethylcarbamyloxyalkylene)-piperazinyl; and R₃ is a member selected from the group consisting of hydrogen and methyl; each of the aforesaid alkylene moieties having from 2 to 4 carbon atoms.

2. A chemical compound having the basic structural formula:

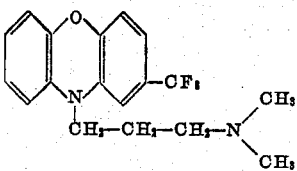

3. A chemical compound having the basic structural formula:

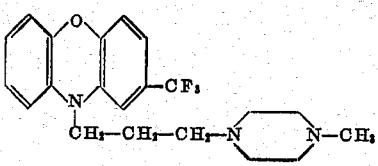

4. A chemical compound having the basic structural formula:

[phenoxazine]-CF₃ with N-CH₂-CH₂-CH₂-N⟨piperazine⟩N-alkylene-hydroxy in which the alkylene moiety has 2 to 4 carbon atoms.

5. A chemical compound having the basic structural formula:

[phenoxazine]-CF₃ with N-CH₂-CH₂-CH₂-N⟨piperazine⟩N-CH₂CH₂-OH

6. A chemical compound having the basic structural formula:

[phenoxazine]-CF₃ with N-CH₂-CH₂-CH₂-N⟨piperazine⟩N-alkylene-oxy-acyl in which the alkylene moiety has 2 to 4 carbon atoms and the acyl moiety is alkanoyl having from 2 to 4 carbon atoms.

7. A chemical compound having the basic structural formula:

[phenoxazine]-CF₃ with N-CH₂-CH₂-CH₂-N⟨piperazine⟩N-CH₂CH₂-O-COCH₃

8. A chemical compound having the basic structural formula:

[phenoxazine]-CF₃ with N-CH₂-CH₂-CH₂-N⟨piperazine⟩N-alkylene-oxy-alkylene-hydroxy in which each of the alkylene moieties has 2 to 4 carbon atoms.

9. A chemical compound having the basic structural formula:

[phenoxazine]-CF₃ with N-CH₂-CH₂-CH₂-N⟨piperazine⟩N-CH₂CH₂-O-CH₂-CH₂-OH

10. A chemical compound having the basic structural formula:

[phenoxazine]-CF₃ with N-CH₂-CH₂-CH₂-N⟨piperazine⟩N-CH₂CH₂-O-CH₂CH₂-O-CH₂CH₂-OH

11. A chemical compound having the basic structural formula:

[phenoxazine]-CF₃ with N-CH₂-CH₂-CH₂-N⟨piperazine⟩N-CH₂CH₂-O-CONH₂

12. A chemical compound having the basic structural formula:

[phenoxazine]-CF₃ with N-CH₂-CH₂-CH₂-N⟨piperazine⟩N-CH₂CH₂-[phenyl]-NH₂

13. A chemical compound having the basic structural formula:

[phenoxazine with NH]-CF₃

References Cited in the file of this patent

UNITED STATES PATENTS

| | | |
|---|---|---|
| 2,464,885 | Olpin | Mar. 22, 1949 |
| 2,485,212 | Miescher et al. | Oct. 18, 1949 |
| 2,645,640 | Charpentier | July 14, 1953 |
| 2,676,971 | Cusic et al. | Apr. 27, 1954 |

FOREIGN PATENTS

| | | |
|---|---|---|
| 201,628 | Australia | Oct. 20, 1955 |
| 103,301 | Germany | Mar. 12, 1897 |

OTHER REFERENCES

Massie: Chem. Reviews, vol. 54, p. 823 (1954).